United States Patent [19]

Loh et al.

[11] Patent Number: 4,608,309

[45] Date of Patent: Aug. 26, 1986

[54] THERMAL ENERGY STORAGE SLURRY MATERIAL

[75] Inventors: Ih-Houng Loh, Cambridge; Robert E. Cohen, Jamaica Plain; Raymond F. Baddour, Belmont, all of Mass.

[73] Assignee: Massachusetts Institute of Technology, Cambridge, Mass.

[21] Appl. No.: 725,617

[22] Filed: Apr. 22, 1985

[51] Int. Cl.$^4$ ............................. B05D 3/04; C08J 3/24
[52] U.S. Cl. ...................................... 428/409; 427/34; 427/38; 428/402; 428/407; 523/135; 524/261; 524/386
[58] Field of Search ............................ 525/356, 326.1; 524/261, 386; 523/135; 428/407, 409, 402; 427/34, 38

[56] References Cited

U.S. PATENT DOCUMENTS

| | | | |
|---|---|---|---|
| 3,969,547 | 7/1976 | Isawa et al. | 427/214 |
| 3,988,296 | 10/1976 | Bethea et al. | 260/45.75 B |
| 4,029,862 | 6/1977 | Liu et al. | 526/43 |
| 4,035,560 | 7/1977 | Caumartin et al. | 526/124 |
| 4,166,167 | 8/1979 | Eye et al. | 526/142 |
| 4,182,398 | 1/1980 | Salyer et al. | 165/1 |
| 4,264,750 | 4/1981 | Amand et al. | 525/356 |
| 4,268,579 | 5/1981 | Suzuki et al. | 428/413 |
| 4,314,053 | 2/1982 | Lin et al. | 528/483 |
| 4,404,256 | 9/1983 | Amand et al. | 428/409 |
| 4,414,351 | 11/1983 | Suzuki et al. | 524/413 |
| 4,420,609 | 12/1983 | Lin et al. | 524/486 |
| 4,426,465 | 1/1984 | Maki et al. | 523/135 |
| 4,508,781 | 4/1985 | Yagi et al. | 428/409 |

FOREIGN PATENT DOCUMENTS

DE3321905A 6/1982 Fed. Rep. of Germany .
58-174487 10/1983 Japan ................... 523/135

OTHER PUBLICATIONS

Polymer Engineering & Science, Sep. 1975, vol. 15, pp. 673–678, Kaelble et al.
Industrial Chemical News, "Fabrics", Sep. 1984.
Chemical Week, Aug. 1, 1984, pp. 22–23.
Polymer Engineering & Science, Nov. 1984, pp. 1227–1231, Boneh et al.

*Primary Examiner*—Allan M. Lieberman
*Attorney, Agent, or Firm*—Paul J. Cook

[57] ABSTRACT

A thermal energy storage composition is provided comprising a slurry of polyolefin particles in a liquid. The particles have their surfaces crosslinked in a cold plasma so that the crosslinked surfaces have a heat of fusion substantially identical to the uncrosslinked portion of the particles.

9 Claims, 1 Drawing Figure

THERMAL ENERGY STORAGE SLURRY MATERIAL

The Government has rights in this invention pursuant to Grant Number CPE-8025302 awarded by the National Science Foundation.

BACKGROUND OF THE INVENTION

The present invention relates to a thermal energy storage material.

Certain polymeric materials have been examined in the prior art for thermal energy storage for home heating and cooling applications. A candidate material is a lightly crosslinked high density polyethylene in the form of pellets. The crosslinking is necessary to prevent the pellets from sticking together when heated above the melting point.

The following three methods of controlled chemical crosslinking of high density polyethylene have been reported in Salyer, I. O. and Davison, J. E., "Thermal-Energy Storage in Crosslinked Pellets of High-Density Polyethylene for Home Heating and Cooling via Off-peak Electric Power Utilization," J. Appl. Poly Sci., 28, 2903, 1983. The first method relates to peroxide-initiated, free radical crosslinking. The second and third methods, respectively, relate to vinyl triethoxy silane grafting crosslinking and electron beam crosslinking. In all of these cases, the crosslinks eliminate the melt flow which is desirable for high-temperature form stability. However, undesirably, these processes decrease crystallinity and heat of fusion which is highly desirable for thermal energy storage. All three methods of crosslinking were reported to result in losses of up to thirty percent of the initial heat of fusion The following United States patents to Anand et al relate to processes and products resulting from the treating of polymers with a cold plasma for fluorinating the surface of the polymer. U.S. Pat. Nos. 4,264,750 and 4,404,256 describe processes and products of this nature for various uses but not as a thermal energy storage material.

Treatment of polymer surfaces with reactive and nonreactive cold plasmas is discussed in the following articles: Baddour, R. F. and Timmins, R. S., eds., "The Application of Plasmas to Chemical Processing", M.I.T. Press, 1967; Hollahan, J. R. and Bell, A. T., eds., "Techniques and Applications of Plasma Chemistry", Wiley, New York, 1974; Boenig, H. V., ed., "Plasma Science and Technology", Cornell University Press, Ithaca, 1982; Boenig, H. V., ed., "Plasma Chemistry and Technology", Technomic Publishing Co., Pennsylvania, 1983; Clark, D. T., Dilks, A. and Shuttleworth, D., "The Application of Plasma to the Synthesis and Surface Modification of Polymers, Polymer Surfaces", Clark, D. T. and Feast, W. J., eds., Wiley, New York, 1978; and Yasuda, H., "Plasma Modification of Polymers", J. Macromol. Sci.-Chem., A10 (3), 15, 1976.

SUMMARY OF THE INVENTION

The present invention provides a non-reactive thermal storage material capable of being easily transported.

The thermal energy storage material of the present invention includes particles which have a heat of fusion of a high density polyethylene polymer and possesses desirable nonsticking properties. The particles retain their desirable shape and particle distribution in a fluid. The process of the present invention results in an entire surface portion of powder particles being modified with an inconsequential effect on the desirable heat of fusion properties so that the resulting slurry has a high thermal efficiency. Thus, the desirable thermal efficiency of a thermal energy storage system is retained for a long period of time and over repeated and continuous use.

According to the present invention, thermal energy storage materials comprising a slurry consisting essentially of particles of a high density polyethylene polymer is mixed with a fluid. The fluid is a liquid at temperatures and pressures used for thermal energy storage. The particles have substantially the entire surface portions of substantilly all of the particles modified to prevent fusion of the particles to each other at relatively high temperatures utilized for thermal energy storage wherein the heat of fusion of the particles is substantially identical to the particles of high density polyethylene polymer prior to surface modification.

Also, in accordance with a further aspect of the invention, there is provided a process for preparing a thermal energy storage material comprising contacting particles consisting essentially of a high density polyethylene polymer with a gaseous medium in a tumbling or rotating bed wherein the particles fall free to modify the surfaces as described above. The modified particles are mixed with a fluid to form a slurry for thermal energy storage.

The contents of copending application Ser. No. 725,618 entitled "Thermal Energy Storage Powdered Material" to the applicants of the present invention and which is filed concurrently with this application is incorporated by reference into the contents of the present invention.

Also, the contents of U.S. Pat. No. 4,264,750 to the present inventors and entitled "Process for Fluorinating Polymers" is incorporated herein by reference into the contents of the present invention.

IN THE DRAWINGS

FIG. 1 is a schematic view of the apparatus used for preparing a thermal energy storage material of the present invention.

DETAILED DESCRIPTION

Figure 1:
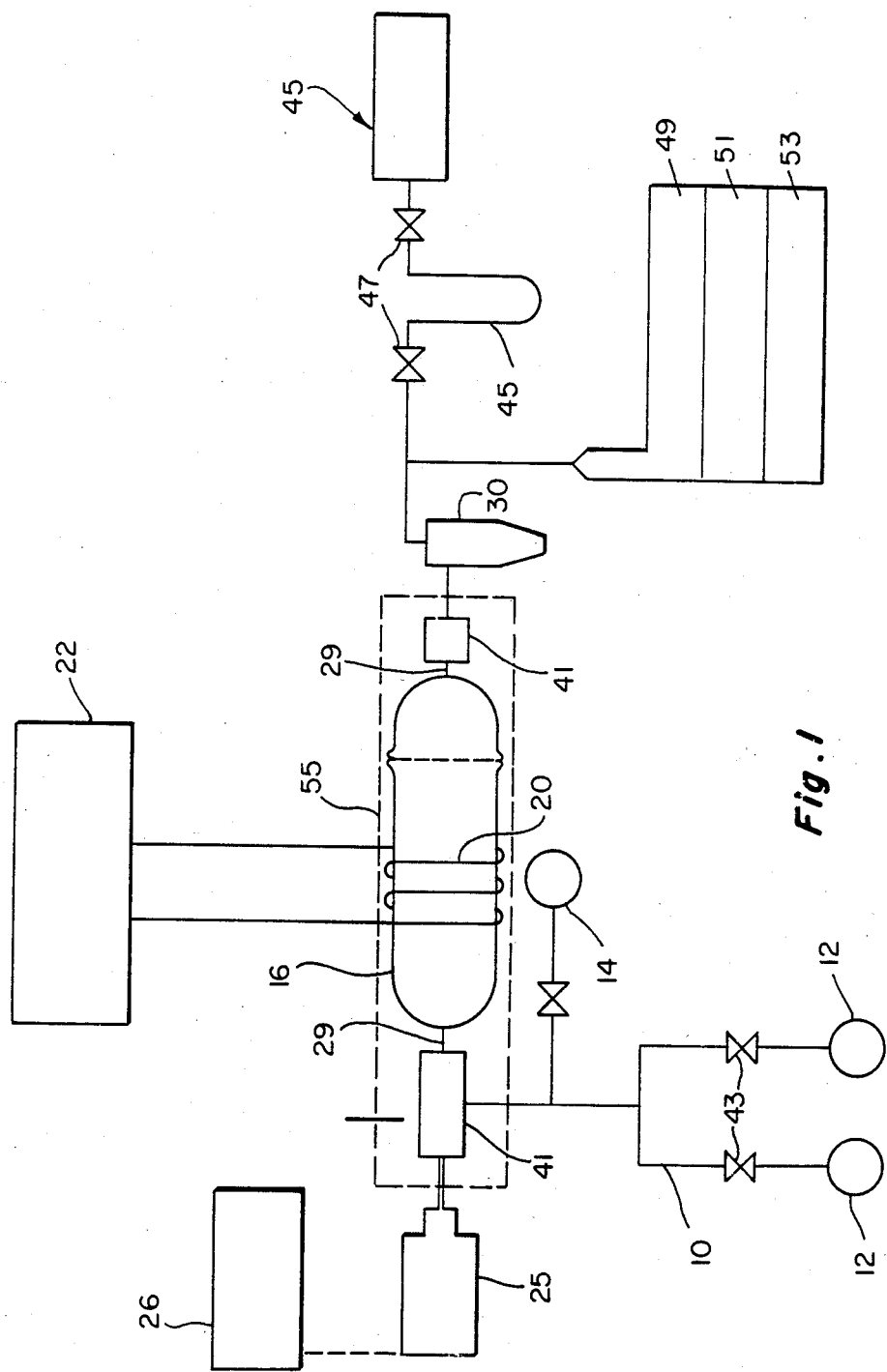

The treated thermal energy storage powder of this invention has physical characteristics of the powder particle substantially identical to the untreated starting powder as hereinafter described. According to a surface modification treatment, the surface of the particles are altered only to a depth which does not effect the favorable thermal energy storage properties which remain substantially identical to the untreated starting powder. More particularly, the heat of fusion is substantially identical to the untreated powder particles even though the treated particles have substantially the entire surface modified, either by crosslinking and/or by fluorinating. The surface modification is at a depth less than about 1000Å and preferably within the range of from about 50Å to about 100Å.

The starting powders of the present invention comprise a dense, free flowing non-porous polyolefin polymer or copolymer. The term polyolefin is used to denote polymers of ethylene, propylene and butylene and copolymers thereof. Polyethylene polymers, for example, have absolute densities of from about 0.95 to about 0.97 grams per cubic centimeter and melting points of from about 120° C. to about 135° C. Preferred powders comprise a loosely packed bed wherein the particles have a diameter greater than about ten microns. Most preferably the particles are substantially spherically shaped. The particles of the powder typically have a diameter of about 0.1 millimeter. Typically, polyethylene has a heat of fusion from about 44 to about 58 calories per gram.

The apparatus used according to the process of the present invention to prepare powders is schematically shown in FIG. 1. As shown in the figure, a gas is supplied to conduits 10 which includes mass flow meters 12 and capacitance manometer 14. The gas mixture enters rotating vacuum seal 41 and reaction chamber 16 which is surrounded by an induction coil 20. A radio frequency generator 22 is connected to induction coil 20. The reaction chamber 16 is rotated about an axis by a motor 25 along the axial direction; motor speed is regulated by controller 26. The axial rotation of the reaction chamber 16 causes the polymeric particles to loosely tumble within the chamber during the crosslinking reaction. The inlet 27 and outlet 29 are resepctive axial ends for the flow of the gaseous medium. Preferably, the reaction chamber 16 includes an internal baffle or internally protuding surface to promote mixing and contact of the gaseous medium with the surface of the particles. The particles exit outlet 29 and pass into cyclone 30 where they are recovered. According to a preferred process, the apparatus may be modified to provide a continuous process by providing an additional inlet and outlet for the flow of powder. The untreated powder enters the inlet, flows countercurrent to the gaseous medium and exits the outlet.

According to the process of the present invention, the starting polyethylene particles are treated with a relatively cold plasma gaseous medium for a sufficient period of time to modify substantially the entire surface of the particles. The cold plasma used here is generally characterized as a "glow discharge" and classified by the electron energy and density. Typically, the average electron energy is on the order of 1 to 10 ev and the electron density is in the range of $10^9$ to $10^{12}$ cm$^{-3}$. The corresponding Debye length, a measure of the distance over which a charge separation can occur, is about 0.01 cm. Additionally, such plasmas lack equilibrium between the electron temperature Te and the gas temperature Tg. The ratios for Te/Tg lie in the range 10 to $10^2$. This lack of thermal equilibrium can provide a plasma in which the electron energies are sufficiently high to rupture molecular bonds and kinetically cause other transformation. The temperature of the plasma during the surface modification reaction is preferably from about 25°0 to about 80° C. It has generally been observed that exposure of polymers to an activated inert gas plasma results in extensive crosslinking on the polymer surface layer. Both the ultraviolet radiation and reactive radicals in the plasma are capable of generating free radicals on the surfaces of many polymers which lead to the formation of crosslinks in the outermost surface. It is important that the thickness and integrity of the crosslinked layer be large enough to retain the melt polymer within its shell when the temperature is raised above the melting point. Development of a surface crosslinked layer has been shown to be related to the length of plasma exposure, the choice of the plasma conditions and the nature of the polymer. The residence time is preferably from about 30 to about 90 minutes, and more preferably from about 50 to about 70 minutes. Longer times are undesirable because no substantial benefits are obtained thereby. Shorter times are undesirable because the depth of reaction is too small. The inert gas plasmas provide only the crosslinked layers on the polymer surfaces. However, the fluorinating gas plasmas provide not only the crosslinked layers but also fluorinated surfaces. The fluorinated surface has properties of low surface energy which will be non-sticking and non-wettable. Particles with these properties will have less probability to contact each other and hence retain their desirable shape and particular distribution in a fluid for thermal energy storage.

A cold plasma can be generated by conventionally available means such as radio frequency excitation, microwave excitation or with electrodes. Suitable plasmas can be formed with a radio frequency discharge operating between about 10 kilohertz to 20 megahertz and about 10 to 500 watts, or with a microwave discharge operating between about 10,000 to 1,000,000 megahertz and about 10 to 500 watts. These wattage considerations are based upon a 6 inch diameter reactor and may be increased for a larger reactor. The glow discharge utilized herein is fundamentally different from corona or arcing discharges which occur at higher pressures than employed in this invention. Thus, the cold plasma utilized herein effects surface changes under much milder conditions when compared with corona or arcing discharges.

The gaseous medium may be an inert gas capable of generating free radicals on the surface of the polyethylene powder particles when present as a cold plasma. The free radical generation should be sufficient to only result in the crosslinking of the surface. Typical inert gases include helium, argon, krypton, neon and xenon. Helium and argon are the preferred inert gases. Inert means that plasma gas components do not become involved in polymer surface reaction. The inert plasmas are usually regarded as physical processes in which energetic ions, though unable to react chemically with the polymer surface, can impart kinetic energy and momentum to eject surface atoms from the surface. The mechanism for surface crosslinking is the production of reactive sites within the polymer by the inert plasma, which then react with adjacent chains to produce a network structure. The crosslinking reaction results in the replacement of a carbon to carbon double bond with two carbon to carbon single bonds but does not change the chemical composition. The use of an inert gas is described in applicants' copending application referred to above which is incorporated herein by reference.

When the gaseous medium is a fluorinating gas as described in U.S. Pat. No. 4,264,750 which is incorporated herein by reference, the gas reacts with the high density polyethylene polymer particles to form a low energy surface which does not alter the heat of fusion of the resulting polymer. In this case, the cold plasma formed comprises ions or radicals of fluorinated species. As set forth in the above patent, this species may be fluorine, hexafluoroethane, tetrafluoromethane, sulfur hexafluoride, difluoromethane, trifluoromethane and other fluorocarbon gases and mixtures thereof.

In forming the slurry of the present invention with the solid polyethylene particles as described above, the fluid portion is a chemically inert liquid organic or inorganic material, provided that it is a fluid at the desired temperature range. Typical fluids include ethylene glycol, silicone oil, mineral oil or the like so long as the fluid is chemically inert and exhibits desirable viscosity characteristics within the temperature range utilized.

The following examples illustrate the present invention and are not intended to limit the same.

EXAMPLE I

The apparatus as utilized in this example is as shown in FIG. 1. The Pyrex tubular reactor which includes rotating vacuum seals 41 on either end is separable into two parts to permit loading of the starting powder. Rotation of the reaction is performed by a variable speed gear motor 25 (Bodine, Model 42D 5BEPM-53) with a variablel speed control 26 (Minarik Model SLF68) capable of rotating the reactor at speeds of from 2 to 50 rpm. The interior wall of the reactor 16 is dimpled at several points around the interior periphery to promote mixing of the powder. The reactor includes rotating vacuum seals 41 constructed of brass, teflon and nylon to permit the passage of a gaseous media through the reactor in the axial direction during rotation. Inlet gases are passed through mass flowmeters (Hasting-Raydist, Model Nall 100 and LF 50) and micrometer needle valves 43 before being admitted to the reactor. The exiting exhaust gases are passed through liquid nitrogen trap 45 and then to a vacuum pump 46. The system pressure is regulated by constricting the downstream vacuum valves 47 and is monitored by an absolute capacitance manometer before and after the reactor. The reactor 16 is positioned interior to an axial aligned electrical coil 20 which has copper coil windings surrounding the periphery of the reactor 16. The coil, which is connected to a 13.56 MHz R.F. generator 22 (LFE Corp.) by a shielded coaxial cable creates a cold plasma interior in the reactor. A UV-Visible emission spectrometer 49 is used to analyze the plasma components and a quadrupole mass spectrometer 51 is used tor analyzing the mass range. The vacuum pump 53 is similarly positioned. For protection, the reactor 16 and coil are surrounded by a perforated copper cage 55.

In the utilization of the apparatus, the starting powder is placed inside the reactor prior to evacuation. When the pressure drops to less than 0.1 torr, the reacting gas is admitted and allowed to flow for approximately ten minutes before turning on the generator to form the plasma. The pressure as monitored by the capacitance manometer is on the order of 1 torr. Power supplied to the reactor typically is 20 to 200 watts. The reactions are carried out according to the conditions specified as to gas mixture, flow rates and reaction times. At the end of the reaction, the reactor is flushed with helium gas at 1 torr for 10 minutes and helium is slowly leaked into the reactor to bring the pressure up to atmospheric. The surface of the compositions was investigated by X-ray Photoelectron Spectroscopy by dusting the powders on a double-stick tape which was then mounted on a glass slide of analysis.

Using the above apparatus and process, pure helium is used to treat a high density polyethylene powder free of additives having a 8.0 melt index, relatively narrow MWD and 0.965 g/cc density according to the following reaction conditions: reaction time of 60 min, temperature 25° to 80° C., flow rate of 40 cc/min (STP) of gas per 50 grams of polyethylene powder.

The resulting powder after reaction is studied with ESCA. The spectrum indicates that except for a small percentage of oxygen which exists on the surfaces, the chemical composition is the same as for non-treated materials. The resulting powder showed no change in the melting point or the degree of crystallinity. The thermograms showed essentially no difference between the treated and the untreated powders.

According to another example, the feed gas employed is a five percent by volume fluorine gas mixed with the remainder helium, in one case, and the remainder argon in the other case.

Using the above apparatus and process, the above fluorine containing gases are used to treat a high density polyethylene powder free of additive having a 8.0 melt index, relatively narrow MWD and 0.965 g/cc density according to the reaction conditions set forth above.

The resulting powders after reaction are studied with ESCA. The spectrum indicates that the large fluorine peaks near 700 eV indicates that extensive fluorination has occurred. In the high resolution mode, the ESCA spectra revealed shifts of the C(ls) peaks resulting from changes in the chemical environment of the carbon atom. The resulting powder showed no change in the melting point or the degree of crystallinity by differential scanning colorimetry. The thermograms showed essentially no difference between the treated and the untreated powder.

The above described powders are mixed with ethylene glycol and silicone oil respectively to form slurries. A physical observation of the melt/cool cycle of the dense slurries is made. In a narrow one to two degree centigrade temperature range near the melting point, the slurry transforms from a white opaque medium below melting temperature to a transparent suspension of tiny deformable droplets above the melting temperature. This phenomenon is entirely reversible over an apparently unlimited number of cycles.

We claim:

1. A thermal energy storage material comprising a slurry consisting essentially of substantially non-sticking particles of a polyolefin mixed with a fluid, said fluid being a chemically inert liquid at temperatures and pressures used for thermal energy storage, said particles having substantially the entire surface portions of substantially all of said particles crosslinked at a depth less than 1000 Angstroms to prevent fusing of said particles to each other at relatively high temperature utilized for thermal energy storage wherein the heat of fusion of said particles is substantially identical to said particles of polyolefin prior to surface crosslinking.

2. A thermal energy storage material according to claim 1 wherein said particles of polyolefin are substantially spherically shaped.

3. A thermal energy storage material according to claim 1 or 2 wherein said particles are formed of polyethylene polymer.

4. A thermal energy storage material according to claim 1 wherein said fluid is selected from the group consisting of organic and inorganic chemically inert liquids.

5. A thermal energy storage material according to claim 4 wherein said fluid is ethylene glycol.

6. A thermal energy storage material according to claim 4 wherein said fluid is a silicone oil.

7. A process for preparing a thermal energy storage material comprising contacting non-sticking particles consisting essentially of a polyolefin with a relatively cold plasma gaseous medium for crosslinking substantially the entire surface portion of substantially all of said particles at a depth less than 1000 Angstroms and forming surface modified particles, said crosslinking being sufficient to prevent fusing of said particles to each other at relatively high temperatures utilized for thermal energy storage, said surface crosslinked particles having a heat of fusion substantially identical to said particles of polyolefin prior to surface modification, mixing said surface crosslinked particles with a fluid to form a slurry for thermal energy storage, said fluid being a chemically inert liquid at temperatures and pressures used for thermal energy storage.

8. A process for preparing a thermal energy storage material according to claim 7 wherein said gaseous medium consists essentially of an inert gas.

9. A process for preparing a thermal energy storage material according to claim 7 wherein said gaseous medium is selected from the group consisting of an aliphatic hydrocarbon containing fluorine and a gaseous mixture comprising fluorine gas and an inert gas, said gaseous medium being suitable to substantially completely fluorinate the surface of said high density polyethylene polymer without substantial degredation.

* * * * *